United States Patent [19]
Morrissey

[11] 3,896,095
[45] July 22, 1975

[54] HALOGENATION OF ETHYLENE TERPOLYMERS IN A WATER SLURRY

[75] Inventor: Richard T. Morrissey, Cuyahoga Falls, Ohio

[73] Assignee: The B. F. Goodrich Company, Akron, Ohio

[22] Filed: Nov. 12, 1973

[21] Appl. No.: 414,889

[52] U.S. Cl. .......................... 260/80.78; 260/96 HA
[51] Int. Cl.² .......................................... C08F 8/22
[58] Field of Search ..................... 260/80.78, 96 HA

[56] References Cited
FOREIGN PATENTS OR APPLICATIONS
989,491   4/1965   United Kingdom
1,023,407   3/1966   United Kingdom
2,262,723   6/1973   Germany OTHER PUBLICATIONS
Campbell and Lyman, J. Polymer Science, 1961, 55, pp. 169-180.
Makowsk in "Polymer Chemistry of Synthetic Polymers" – Part II, Interscience (1969) pp. 905-937.
Makowski in "Polymer Chemistry of Synthetic Elastomers," Part II (Interscience, 1969) pp. 905-937.

Primary Examiner—Joseph L. Schofer
Assistant Examiner—A. L. Clingman
Attorney, Agent, or Firm—A. C. Doxsey

[57] ABSTRACT

In a process whereby ethylene is copolymerized with another alpha-olefin and a norbornene polyene under pressure with a vanadium catalyst to form amorphous vulcanizable elastomers, it is possible to halogenate the terpolymers in a water slurry by the addition of liquid halogen. The proportion of water to terpolymer crumb in the slurry is critical and must be carefully controlled. The halogenated EPDM terpolymer is cure compatible with unsaturated elastomers such as NR, IR, SBR and BR.

4 Claims, No Drawings

HALOGENATION OF ETHYLENE TERPOLYMERS IN A WATER SLURRY

BACKGROUND OF THE INVENTION

Amorphous, linear high molecular weight terpolymers of ethylene, propylene and third monomer copolymerizable therewith and containing more than one carbon-to-carbon double bond, i.e. a polyene, are known and designated as EPDM rubbers. These terpolymers are vulcanizable by the use of conventional sulfur-based mixes, such as those often used in the curing of butyl rubber. The ethylene and propylene derived portions of the macromolecule form the amorphous portion and the polyene third monomer introduces sites of unsaturation into the macromolecular main chain without altering elastomeric characteristics. The EPDM terpolymers are presently prepared in solvent polymerizations as described in U.S. Pat. Nos. including 2,933,480 and 3,000,866. Suspension polymerization systems in which liquid monomers form the polymerization medium are described in U.S. Pat. Nos. including 3,520,859; 3,527,739; 3,531,446 and 3,631,007. Because of the high ozone resistance shown by EPDM rubbers it is desired to blend them with the unsaturated rubbery polymers currently used in the manufacture of pneumatic tires, for example.

Even though the slightly unsaturated ethylene-propylene-polyene polymers will undergo a cure with sulfur, they will not compatibly co-cure with highly unsaturated natural rubbers or diene rubbers in blends such as are desirably made in the preparation of stocks for passenger car tires, truck tires, airplane tires and heavy duty off-the-road tires.

Therefore, blends of minor amounts of ethylene-propylene-polyene polymers cannot be readily made with natural rubber or SBR in a tire stock to take proper advantage of the great ozone resistance of the saturated EPDM polymer. Conversely, even a very small amount of unsaturated rubber in a batch of saturated EPDM rubber will completely upset the cure rate and properties of the batch because the unsaturated rubber (the contaminant) uses up the curing agents and proper cure of the remainder of the batch is not obtained. This means that when one desires to run a batch of ethylene-propylene-polyene polymer in regular rubber processing equipment, e.g., Banbury mixers and the like, it is necessary to thoroughly clean contaminating stocks from the equipment before, and perhaps after, the desired batch is run. Such cleanup is time consuming and causes the waste of much high grade stock used in "clean out batches" which, at best, is down graded to workaway material or at the worst must be scrapped. This cleanup is expensive and undesirable.

The ethylene-propylene-polyene polymers show great promise for improving product ozone resistance, weather resistance, heat resistance, and chemical resistance, when blended with natural rubber and other unsaturated rubbers, in rubber articles made therefrom, particularly tires, which today consume more rubber hydrocarbon than any other single product. It seems feasible to make a tire of 100 percent ethylene-propylene-polyene polymer, but there are problems with hot tear resistance and body tack and the most effective way for the EPDM polymers to enter the tire field is by blending them with natural rubber (NR), styrene-butadiene rubber (SBR) and cis-polybutadiene rubber (BR), which are the major rubbery materials used in tire manufacture today. It is also desirable to blend highly ozone resistant ethylene-propylene-polyene polymers with oil resistant butadiene-acrylonitrile elastomers (NBR) and obtain compatibly cured stocks. At present this compatibility does not exist. The ethylene-propylene-polyene polymers will not co-cure in the sulfur cures with highly unsaturated natural rubber or diene rubbers.

The prior art, for example Belgium Pat. No. 648,655, teaches that halogenation of ethylene-propylene-polyene interpolymers by dissolving the polymers in solvent and subjecting them to treatment with molecular halogen agents and heating to about 100°C. results in the formation of halogenated EPDM materials with properties unexpectedly superior to those of halogen-free materials. Halogenated ethylene-propylene-polyene terpolymer will co-cure in sulfur curing systems with natural rubber and diene unsaturated rubbers in all proportions, and shows improved adhesion to natural rubber over ethylene-propylene-diene unhalogenated terpolymers. The term halogen as used herein includes bromine and chlorine.

The halogen-containing ethylene-propylene-polyene polymers may be mixed with natural rubber and diene rubbers in any desired proportions and the resulting mixtures will co-vulcanize in sulfur systems to give elastic products with excellent properties. Mixtures of ethylene-propylene-polyene polymer with small amounts of natural rubber cannot be vulcanized to appreciable strength, but similar mixtures containing halogenated terpolymers have high strength and good properties. Small amounts of halogenated ethylene-propylene-polyene polymer blended with natural rubber greatly improve the ozone resistance, flex resistance, and other properties of the co-vulcanizates whereas unhalogenated ethylene-propylene-polyene polymers used to blend with natural rubber act only as inert fillers and give no significant improvement in properties. For reasons of cost, convenience and safety it would be desirable to prepare the halogenated EPDM materials by a process that will avoid the use of organic solvents and the attendant demand for recovery thereof.

Halogenation of EPDM polymers in solvent systems has provided uniformly halogenated polymers as shown by physical tests on blends of the materials with unsaturated rubbers. Attempts to halogenate EPDM polymers in water systems have, until now, given non-uniform results, perhaps due to variations in permeability of the polymer particles and perhaps due to reaction of the halogen with the water medium itself.

The invention described herein provides a process whereby an ethylene-propylene-polyene terpolymer can be uniformly halogenated in crumb form in a water slurry.

SUMMARY OF THE INVENTION

It has been found that, after the polymerization in the presence of a reduced vanadium catalyst in a suspension system of ethylene, propylene and a third monomer polyene, such as ethylidene norbornene, when the final polymerization mixture is water washed and the excess monomers and hydrocarbon suspension fluid are flashed off, the subsequent addition of from about 6 to about 12 parts per hundred parts polymer of bromine or chlorine to the polymer crumb suspended in water as a 12 to 25 percent, preferably 12 to 18 percent, polymer crumb slurry by weight, forms a halogenated terpolymer which contains from about 3.0 to about 6.5 percent halogen by weight of said terpolymer. The said halogenated terpolymer is found to be fully compatible in sulfur cure with unsaturated elastomers. An EPDM terpolymer prepared in a solvent system is also amenable to the process if it is recovered from the solvent, shredded into crumb particles and slurried in water.

DETAILED DESCRIPTION OF THE INVENTION

The monomers polymerized in accordance with this invention are ethylene, another α-olefin as propylene or butene-1, and a polyene comprising a polyunsaturated bridged-ring compound having at least one carbon-to-carbon double bond in a bridged ring. Terpolymers employing straight chain polyenes have not been halogenated successfully by the method of this invention. Examples of the bridged-ring polyene compounds include the alkylidene norbornenes, especially the 5-alkylidene-2-norbornenes wherein the alkylidene group contains 1–20 carbon atoms and preferably 1–8 carbon atoms, the alkenyl norbornenes, especially the 5-alkenyl-2-norbornenes wherein the alkenyl group contains 3 to 10 carbon atoms and the 5-alkadienyl-2-norbornenes, especially the 5-alkadienyl-2-norbornenes wherein the alkadienyl group contains from 5 to 9 carbon atoms. At least one double bond is present in a bridged-ring in these compounds and at least one other double bond is present in a bridged-ring or in a side chain. The terpolymers normally have average molecular weights above 20,000 and preferably above 50,000.

Such terpolymers normally contain 50 mol percent or more of ethylene and from about 2 to 8 percent of polyene. Particularly useful are elastomeric interpolymers containing about 50 to less than 80 mol percent ethylene, at least 5 mol percent of propylene or butene, and the polyene in amount to provide in the interpolymer olefinic unsaturation represented by an iodine number of from about 2 to about 35. These polymers may contain from about 2.0 to 8.0 percent of ethylidene-2-norbornene, 5-(2-methyl-2-butenyl)norbornene and 5-(1,5-hexadienyl)-2-norbornene. Other useful polyenes include 5-methylene-2-norbornene, 5-n-propylidene-2-norbornene, and 5-(3,5-dimethyl-4-hexenyl)-2-norbornene.

Propylene is normally fed to the reactor in amounts greater than ethylene. This is readily controlled to obtain the desired polymer composition by a number of ways well known in the art.

One component of the catalyst is a hydrocarbon soluble vanadium compound, including for example, vanadium tetrahalides, vanadium oxyhalides, vanadyl acetylacetonate and vanadyl haloacetylacetonates. Typical hydrocarbon solvent vanadium catalysts include vanadium tetrachloride, vanadium oxytrichloride, vanadium acetylacetonate, vanadyl acetylacetonate and the like.

The other catalyst component is an alkyl aluminum compound of the general formula $R_xAlX_y$ wherein R is an alkyl group containing 2 to 8 carbon atoms, X is halogen, $x$ is 1 to 3, $y$ is 0 to 2, and $x + y = 3$. Typical compounds include triethyl aluminum, triisobutyl aluminum, diethylaluminum dichloride, ethyl aluminum sesquichloride; diisobutyl aluminum fluoride, ethyl aluminum difluoride and the like. One of the catalyst components must contain a halogen atom. The molar ratio of alkyl aluminum compound and hydrocarbon soluble vanadium compound will be between about 35 to 1 and 1 to 1 but the preferred molar ratio is between 30 to 1 and 2 to 1.

While the described halogenation process is particularly useful with polymerizates prepared in suspension in the substantial absence of diluents other than monomers, it is also applicable to polymerizates prepared in systems containing diluents or solvents after the polymer is separated from the hydrocarbon or solvent medium and dispersed in crumb form in water. In such systems a ratio of 10 to 1 of diluent to monomers is often employed. These diluents are normally hydrocarbons including propane, butane, hexane, heptane, benzene, toluene, halogen-containing aliphatic compounds as perchloroethylene and the like. Particularly useful systems use less than a 2:1 ratio of diluent to monomer, based on the volume of propylene.

Modifiers, including small amounts of hydrogen, diethyl zinc and the like, may be used to provide control of polymer molecular weight as is well known to those skilled in the art.

A polymerization temperature in the range of about −80° to about 25°C. may be employed, but more normally a temperature range of −20° to about 10°C. is employed and except at very low temperatures, the polymerizations are normally conducted under pressure.

The pressure at which the polymerization reactions are conducted normally range from about 25 to about 100 psig, that is, about 2 to 7 atmospheres. At temperatures in the range of about −20° to about 10°C. pressures normally will be about 50 to 90 psig.

At the conclusion of polymerization reaction, the catalyst is destroyed or deactivated by contacting the polymerization mixture containing unreacted monomers and the active vanadium catalyst with a counter current flow of hot water, said water being heated to 85°–95°C. The unreacted monomers are extracted and stripped off, by this step.

The polymerizate is now in the form of slurry of polymer crumbs and water. The polymer crumbs are aggregates or agglomerations about 1 to 25 mm. across, comprised of flakes or particles about ½ to 5 mm. across. The slurry is adjusted to a level of 12 to 25 percent polymer crumb by weight, preferably the slurry is about 12–18 percent polymer by weight, most preferably about 14 percent by weight. Slurries above 25 percent by weight are too difficult to agitate successfully to get uniform halogenation. Liquid bromine or chlorine is added slowly to the slurry while vigorous agitation is maintained. After a 15 to 20 minute reaction time an alkaline agent, preferably either sodium hydroxide or potassium hydroxide, is added until pH test indicates that the excess halogen and any hydrogen halide formed are neutralized. The crumb is next washed several times with hot water. Additives such as stabilizers and extending oils may optionally be added at this stage. As in the more well known solvent systems for halogenating EPDM, it is found that bromine adds readily in a non-catalyzed system, but chlorine addition is more efficient and more effective when UV light is used to catalyze the reaction.

The crumb is filtered and dried. Halogen content is readily determined by an X-ray fluorescence spectrometer analysis.

The halogenated ethylene-propylene-polyene polymer is curable in either sulfur cure or metal oxide cure. The halogenated terpolymer is not contaminated by, nor does it contaminate, any of the unsaturated elastomers currently used in pneumatic tire production. It co-cures in sulfur systems with NR, IR and BR. The ozone resistance of the halogenated terpolymer is equivalent to that of an unhalogenated terpolymer.

The halogenated EPDM can be compounded to give cured tensile strength of about 3,000 psi, the addition of up to 10 parts natural rubber to 100 parts halogenated EPDM and co-cure therewith causes less than a 3 percent drop in tensile strength. When a non-halogenated EPDM that also gives a cured tensile of 3,000 psi is blended with 10 parts natural rubber, the tensile strength of the cocured blend is only about 1,600 psi.

When blends of 60-80 parts halogenated EPDM are made with 40-20 parts unsaturated diene or natural rubber, the percent of halogen by weight in the halogenated EPDM is found to coincide with best tensile properties of the blend when the range of halogen in the polymer is 3.0 to 6.5 weight percent.

When halogen is added to EPDM polymer in crumb form in a water slurry, by the addition of halogen thereto, it has been found to be critical to the success of obtaining EPDM containing 3.0 to 6.5 weight percent halogen, that the water slurry contain from 12 to 25 percent by weight of polymer crumb.

EXAMPLE 1

A continuous polymerization is conducted in a pressure vessel equipped with agitation and cooling means. Each hour 29.5 pounds of propylene, 4.25 pounds of ethylene and 0.539 pounds of 5-ethylidene-2-norbornene are charged to the reactor along with the catalyst components, 0.0139 pound of vanadium trisacetylacetonate and 0.073 pound of diisobutyl aluminum chloride dissolved in toluene. As a molecular weight modifier 0.012 pound of diethyl zinc dissolved in hexane is added per hour. Residence time in the reactor is 90 minutes at −10°C. at a pressure of 52 psig.

The reaction product is drawn off to a shortstop tank where the reaction is stopped, the catalyst is deactivated and unreacted monomers are removed by counter current stripping with hot water heated to 95°C. by live steam injection.

The terpolymer crumb is now in the form of a water slurry which is adjusted to 14 percent by weight of crumb. A portion of the polymer is separated, stabilized and dried as described below as a control; it contains no halogen; the dilute solution viscosity determined from 0.2 percent in toluene solution as 25°C. is 2.4; large rotor Mooney value after 10 minutes at 212°F. is 80. The polymer contains 44 percent propylene and 5.3 percent ethylidene norbornene.

Liquid bromine, 9-10 parts per 100 parts polymer by weight, is added slowly with vigorous agitation to the remainder of the polymer slurry and reaction is maintained for 20'. The excess bromine and any HBr that may be present are neutralized with the addition of 36 percent solution by weight of KOH and a 20' neutralization period. The treated polymer crumb is washed with hot water and 2.5 parts of a stabilizer, mixed epoxidized triglycerides, polyglycol adipate and soya oil containing about 65 percent lecithin xylene and 1,1,1-trichloroethane, is added. The crumb is dried under vacuum at 50°C. Analysis of the crumb with an X-ray fluorescence spectrometer shows 5.4 percent bromine in the polymer. Compounds are mill mixed to the following recipes:

|  | A-Control (no-bromine) | B 5.4% bromine |
|---|---|---|
| Polymer | 100.0 | 100.0 |
| Carbon black | 80.0 | 80.0 |
| Stearic acid | 1.0 | 1.0 |
| Naphthenic oil | 55.0 | 55.0 |
| Zinc oxide | 5.0 | 5.0 |
| Mercaptobenzothiazole | 0.75 | 0.75 |
| Tetramethylthiuram monosulfide | 1.50 | 1.50 |
| Sulfur | 1.50 | 1.50 |
|  | 244.75 | 244.75 |

The batches are cured 45' at 307°F., sampled and subjected to standard physical testing with results set forth in Table 1.

Table 1

|  | 300% modulus psi | tensile psi | elong. % |
|---|---|---|---|
| A-Control (no bromine) | 1350 | 1975 | 375 |
| B-(5.4% bromine) | 1675 | 2150 | 340 |

Both polymers are seen to have acceptable physical properties. Portions of the uncured compounded mill mixtures A and B are next blended with smoke sheet natural rubber in proportions 80/20 based on parts polymer:

| Mill Mix | C-Control | D |
|---|---|---|
| as prepared above | 196.0 (A) | 196.0 (B) |
| Smoke sheet | 20.0 | 20.0 |
|  | 216.0 | 216.0 |

The batches C and D are cured 45' at 307°F. and subjected to physical testing with these results:

Table 2

|  | 300% modulus psi | tensile psi | elong. % |
|---|---|---|---|
| C-Control (no bromine) | — | 25 | — |
| D-(5.4% bromine in EPDM) | 1450 | 1650 | 340 |

The brominated EPDM polymer has strength properties equal to or better than those of the unbrominated EPDM polymer, and upon cocure with up to 20 percent by weight of contaminant natural rubber the brominated polymer contributes to a blend with acceptable physical properties. The properties of the blend of unbrominated EPDM and natural rubber are not acceptable.

EXAMPLE 2

A continuous polymerization is conducted in a pressure vessel equipped with agitation and cooling means.

Each hour 29.5 pounds of propylene, 4.25 pounds of ethylene and 0.539 pounds of 5-ethylidene-2-norbornene are charged to the reactor along with the catalyst components, 0.0139 pound of vanadium trisacetylacetonate and 0.0703 pound of diisobutyl aluminum chloride dissolved in toluene. As a molecular weight modifier 0.016 pound of diethyl zinc dissolved in hexane is added per hour. Residence time in the reactor is 90 minutes at −10°C. at a pressure of 52 p.s.i.g.

The reaction product is drawn off to a shortstop tank where the reaction is stopped, the catalyst is deactivated and unreacted monomers are removed by counter current stripping with hot water heated to 95°C. by live steam injection.

The terpolymer crumb is now in the form of a water slurry which is adjusted to 14 percent by weight of crumb. A portion of the polymer is separated, stabilized and dried as described below as a control; it contains no halogen; dilute solution viscosity from 0.2 percent in toluene at 25°C. is 1.57; the polymer raw Mooney is 50.

Liquid bromine, 9 parts per 100 parts polymer by weight, is added slowly with vigorous agitation to the remainder of the polymer slurry and a reaction time of 20' is allowed. The excess bromine and any HBr that may be present are neutralized with the addition of 36 percent solution by weight of KOH, and stirring is continued for 20 minutes. The treated polymer crumbs are washed with hot water and 2.5 parts of a stabilizer, Paraplex G-60, is added. The crumb is dried under vacuum at 50°C. Analysis of the crumb by X-ray fluorescence spectrometry shows 5.0 percent bromine in the polymer. Compounds are mill mixed to the following recipes:

|  | E-Control (no bromine) | F 5% bromine |
|---|---|---|
| Polymer | 100.0 | 100.0 |
| Carbon black | 50.0 | 50.0 |
| Naphthenic oil | 10.0 | 10.0 |
| Stearic acid | 1.0 | 1.0 |
| Zinc oxide | 3.0 | 3.0 |
| Mercaptobenzothiazole | 0.75 | 0.75 |
| Tetramethylthiuram monosulfide | 1.50 | 1.50 |
| Sulfur | 1.50 | 1.50 |
|  | 167.75 | 167.75 |

The compounds are cured 45' at 307°F. and subjected to physical tests with the results set forth in Table 3.

Table 3

|  | 300% modulus psi | tensile modulus | elong. % |
|---|---|---|---|
| E-Control (no bromine) | 2010 | 2370 | 330 |
| F-(5.0% bromine) | 1700 | 1900 | 335 |

Uncured portions of the compounded polymers are mixed above (E and F) are mill blended with NR on an 80/20 basis on parts of polymer:

| Mill Mix | G-Control | H |
|---|---|---|
| As prepared above | 134.2(E) | 134.2(F) |
| Smoke sheet | 20.0 | 20.0 |

The compounds are cured 45' at 307°F. and tested with these results:

Table 4

|  | 300% modulus psi | tensile psi | elong. % |
|---|---|---|---|
| G-Control (no bromine) | 480 | 530 | 360 |
| H-(5.0% bromine in EPDM) | 1200 | 1775 | 375 |

The brominated EPDM polymer is seen to have marked cure compatibility with NR in sulfur cure. When the experiment is repeated using liquid chlorine in place of bromine for the halogenation of EPDM crumb, equivalent cure and cocure properties are obtained.

The control polymers and the brominated polymers of Examples 1 and 2 are exposed at 100°F. in an atmosphere containing 50 pphm of ozone. None of the four polymers shows any evidence of ozone cracking after 168 hours. A natural rubber control sample shows extreme general crack growth after 2 hours. The brominated EPDM polymers are equivalent to unbrominated EPDM polymers in ozone resistance.

EXAMPLE 3

The procedure of Example 1 is followed except that the slurry which is brominated is 24 percent by weight crumb (200 grams polymer in 625 cc water). Eighteen grams liquid bromine is added slowly with stirring over a period of 20 minutes. The excess bromine and HBr are neutralized to litmus and potassium hydroxide (36 percent solution). The crumb is washed thoroughly in hot water, dried and analyzed by X-ray fluorescence analysis. It analyzes 4.8 percent bromine by weight. The polymer is compounded in the recipes shown in Example 1 and evaluated alone and as an 80/20 blend with NR.

Table 5

|  | 300% modulus psi | tensile psi | elong. % |
|---|---|---|---|
| Brominated polymer | 1100 | 1700 | 410 |
| Brominated polymer/NR 80/20 blend | 900 | 1275 | 285 |

The physical properties of both the brominated polymer and the polymer blend are acceptable.

EXAMPLE 4

The procedure of Example 1 is followed except that the slurry brominated is 9 percent by weight crumb (200 grams polymer in 2,000 cc. water). Eighteen grams bromine is added to the slurry and, after neutralization, the dried, brominated terpolymer analyzes 4.4 weight percent bromine. The polymer is compounded in the recipes shown in Example 1 and evaluated alone and as an 80/20 blend with NR.

Table 6

|  | 300% modulus psi | tensile psi | elong. % |
|---|---|---|---|
| Brominated polymer | 1000 | 1600 | 410 |
| Brominated polymer/NR 80/20 blend | 385 | 650 | 975 |

This EPDM, brominated in a 9 percent slurry by weight, is not acceptably compatible in cocure with NR.

EXAMPLE 5

The unbrominated polymer of Example 1 is made up into slurries of varying percent crumb by weight, using 200 grams of polymer and an appropriate amount of water. Eighteen grams bromine is added over a period of 20 minutes and neutralization is effected with KOH solution.

The dried polymers are analyzed for weight percent bromine by X-ray fluorescence spectrometry with these results:

Table 7

| Weight percent in slurry | Weight percent in slurry | 80/20 EPDM/NR blend properties acceptable |
|---|---|---|
| 4.75 | 4.0 | No |
| 9.0 | 4.6 | No |
| 11.75 | 5.2 | Yes |
| 13.8 | 5.4 | Yes |
| 17.8 | 5.3 | Yes |
| 33.0 | 5.0 | No |

As concentration range of polymer in slurry ranges from about 12 to about 18, the percent bromine taken up by the polymer, all other elements of the procedure staying the same, ranges to a maximum of 5.4 percent.

The optimum properties of an 80/20 blend of brominated polymer/NR are found with about 5.2–5.5 weight percent bromine in the polymer. The slurry concentration range that produces 5.2–5.5 weight percent bromine in polymer is 12 to 18 percent.

EXAMPLE 6

A continuous polymerization is conducted in a pressure vessel equipped with agitation and cooling means. Each hour 58.6 pounds of propylene, 12.2 pounds of ethylene and 1.12 pounds of 5-ethylidene-2-norbornene are charged to the reactor along with the catalyst components, 0.0084 pounds of vanadium trisacetylacetonate and 0.029 pounds of diethyl aluminum chloride dissolved in benzene. As a molecular weight modifier 0.0007 pounds of diethyl zinc dissolved in benzene is added per hour. Residence time in the reactor is 90 minutes at 7°C. at a pressure of 80 p.s.i.g.

The reaction product is drawn off to a shortstop tank where the reaction is stopped, the catalyst is deactivated and unreacted monomers are removed by counter-current stripping with hot water heated to 95°C. by live steam injection.

The terpolymer crumb is now in the form of a water slurry which is adjusted to 15 percent by weight of crumb. A portion of the polymer is separated, stabilized and dried as described below as a control. It contains no halogen; dilute solution viscosity from 0.2 percent in toluene at 25°C. is 2.9, the polymer raw Mooney is 55 and the polymer analyzes 61.8 weight percent ethylene, 34 weight percent propylene and 4.2 weight percent ethylidene norbornene.

A 15 weight percent water slurry of 350 grams of polymer crumb is prepared. Thirty-five grams bromine in 75 ml n-pentane is added with vigorous stirring. After 10 minutes of bromination, 35 grams KOH is added to neutralize HBr and excess bromine. Solvent is removed from the brominated polymer crumb by treating the crumb with boiling water. The crumb is dried at 50°C. under vacuum and analyzes 6.3 percent bromine and is marked 6A.

A 15 weight percent water slurry of 100 grams of polymer crumb is prepared and placed in a three-necked 5 liter flask equipped with air stirrer, chlorine inlet and a vent to NaOH solution. With the slurry at 45°C., 10 grams chlorine is passed in over a 5 minute period. A sun lamp is directed into the slurry; UV rays are contained in the flask by a foil covering and temperature is raised to 85°C. Nitrogen is passed through the slurry over a period of 25 minutes to sweep out HCl and excess chlorine. The sunlamp is removed and 10 grams KOH is added and neutralization is carried on for 5 minutes. One hundred parts paraffin oil is added to 100 parts of the polymer. Polymer crumb is washed in hot water (135°F.). The crumb analyzes 4.0 percent chlorine and is designated 6B.

The compounds are mill mixed to the following recipe:

|  | 6A 6.3% bromine | 6B 4% chlorine |
|---|---|---|
| Polymer | 60.0 | 60.0 |
| Natural rubber | 40.0 | 40.0 |
| Carbon black | 80.0 | 80.0 |
| Stearic acid | 1.0 | 1.0 |
| Naphthenic oil | 60.0 | 60.0 |
| Zinc oxide | 4.0 | 4.0 |
| Mercaptobenzothiazole | 0.4 | 0.4 |
| Tetramethylthiuram monosulfide | 0.75 | 0.75 |
| Sulfur | 1.20 | 1.20 |

The batches are cured 45' at 307°F., sampled and subjected to standard physical testing with results set forth in Table 8.

Table 8

|  | 300% modulus psi | tensile psi | elong. % |
|---|---|---|---|
| 6A | 1500 | 1875 | 315 |
| 6B | 1325 | 1725 | 350 |

The unhalogenated EPDM terpolymer blended 60/40 with NR and similarly is completely incompatible with tensile strength less then 1,000 psi in the blend.

I claim:

1. The method of halogenating an ethylene-propylene-polyene terpolymer wherein said polyene is a polyunsaturated bridged-ring compound having at least one carbon-to-carbon double bond in a bridged ring and is a member of the group consisting of 5-alkylidene-2-norbornenes wherein the alkylidene group contains 1–20 carbon atoms, the alkenyl-2-norbornenes wherein the alkenyl group contains 3 to 8 carbon atoms and the 5-alkadienyl-2-norbornenes wherein the alkadienyl group contains from 5 to 9 carbon atoms in a water system whereby the amount of halogen combined with 100 weight parts of said terpolymer is from 3.0 to 6.0 weight percent, comprising:

a. dispersing said terpolymer in crumb form in a water slurry wherein the weight percent of said crumb is in the range 12 to 25, b. adding halogen in excess to said slurry with agitation, c. Neutralizing said mixture with an alkaline medium, d. Filtering, washing and drying said crumb.

2. The method of claim 1 wherein said halogen is bromine.

3. The method of claim 1 wherein said halogen is chlorine.

4. The method of claim 1 wherein said 5-alkylidene norbornenes are selected from the group consisting of 5-ethylidene-2-norbornene and 5-n propylidene-2-norbornene.

* * * * *